Figure 1:
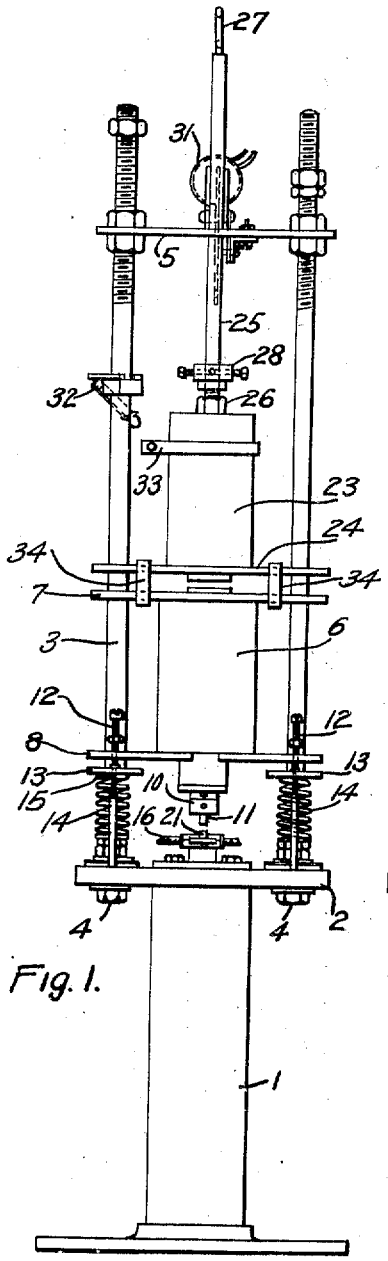

Feb. 3, 1931. L. W. CHUBB Re. 17,949

METHOD OF AND APPARATUS FOR PERCUSSIVE WELDING

Original Filed March 23, 1920 2 Sheets-Sheet 1

WITNESSES:
A. J. Schiefelbein
F. C. Bierman

INVENTOR
Lewis Warrington Chubb.
BY
Wesley G. Carr
ATTORNEY

Feb. 3, 1931. L. W. CHUBB Re. 17,949

METHOD OF AND APPARATUS FOR PERCUSSIVE WELDING

Original Filed March 23, 1920 2 Sheets-Sheet 2

WITNESSES:
A. J. Schiefelbein
J. C. Bierman

INVENTOR
Lewis Warrington Chubb.
BY
Oberlin Clark
ATTORNEY

Reissued Feb. 3, 1931 Re. 17,949

UNITED STATES PATENT OFFICE

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA

METHOD OF AND APPARATUS FOR PERCUSSIVE WELDING

Original No. 1,403,292, dated January 10, 1922, Serial No. 367,999, filed March 23, 1920. Application for reissue filed July 13, 1922. Serial No. 574,827.

My invention relates to the method of and apparatus for welding metal bodies by means of electrical energy supplemented by mechanical energy and it has, for its primary object, the provision of a method and apparatus which shall be particularly effective when it is desired to unite or join metal sections of relatively large diameters.

In a Patent, No. 1,066,468, issued to me July 8, 1913, is disclosed a process and an apparatus for joining wires of relatively small diameters by employing a condenser discharge, supplemented by percussive engagement of the surfaces to be welded at the instant of the condenser discharge. Although the process described in this patent is highly satisfactory for wires of relatively small diameters, some difficulty has been experienced in employing it effectively when joining wires of relatively large diameters.

The method described in the above-mentioned patent could be satisfactorily employed in joining wires of relatively large diameters if a condenser of sufficient size could be utilized. However, in order to employ a condenser of sufficient size to join, for example, wires one-half inch in diameter, the excessive bulk required in the condenser may prohibit its application. This is true, of course, of condensers as now constructed, but this difficulty may be removed by the construction of a compact condenser having a relatively large capacity. One object of my present invention resides, therefore, in providing a process which may be utilized for joining wires of relatively large diameters without the employment of apparatus of large bulk or weight.

Although the process and apparatus hereinafter described is especially suitable for joining wires or other metal bodies of relatively large diameters, it may be successfully employed in uniting wires of comparatively small diameters.

With these and other objects in view, my invention will be more fully described, illustrated in the drawings, in the several views of which corresponding numerals indicate like parts, and then particularly pointed out in the claims.

Figure 2:
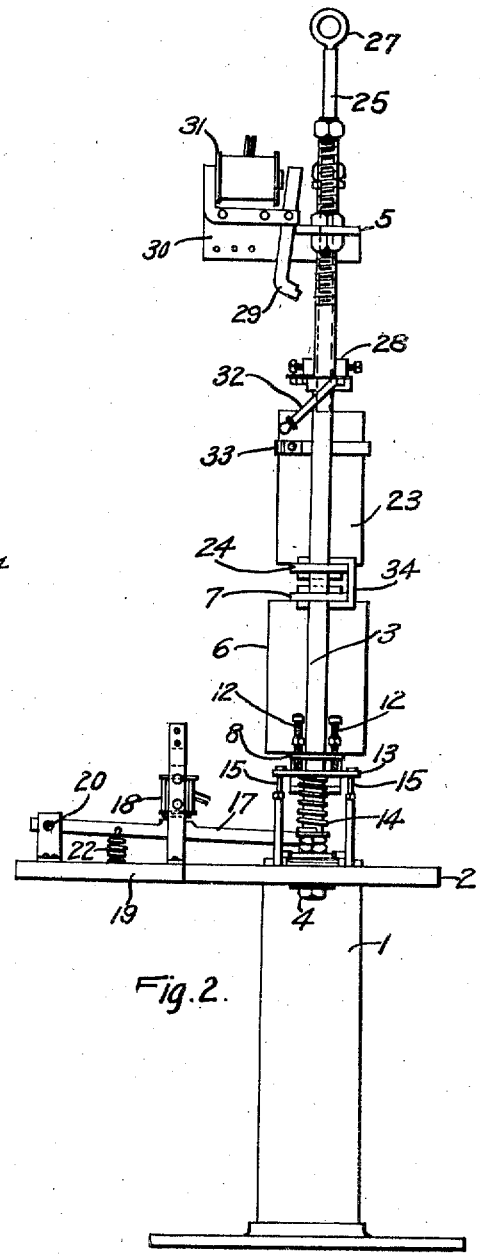
Figure 3:
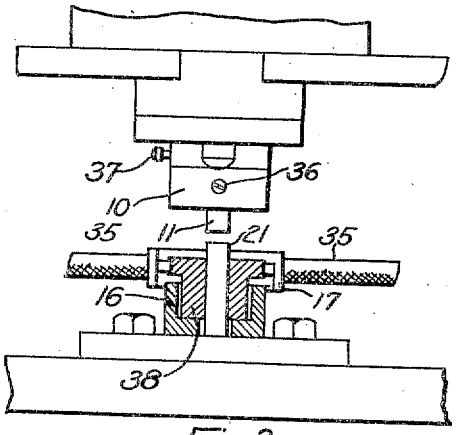
Figure 4:
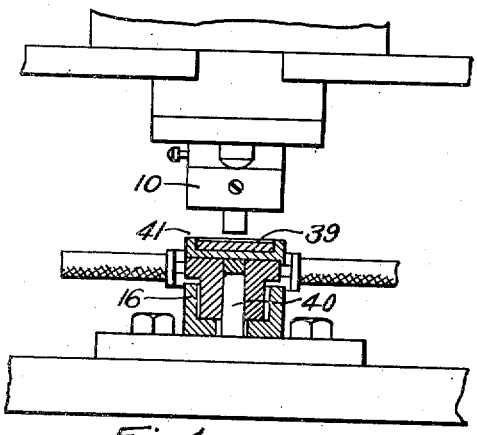
Figure 5:
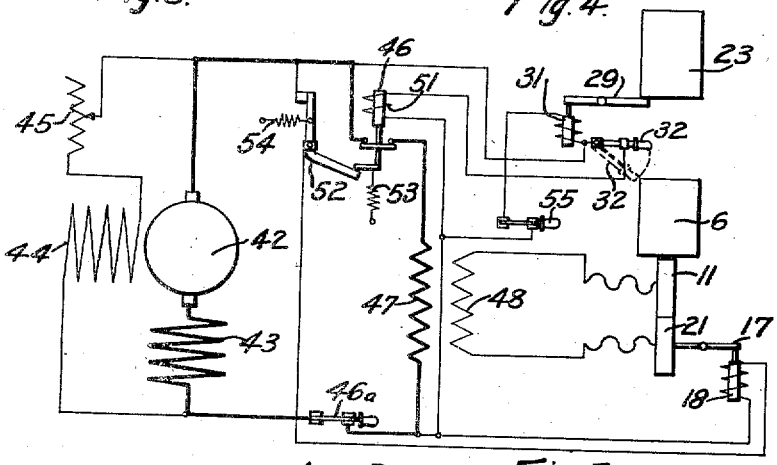
Figure 6:
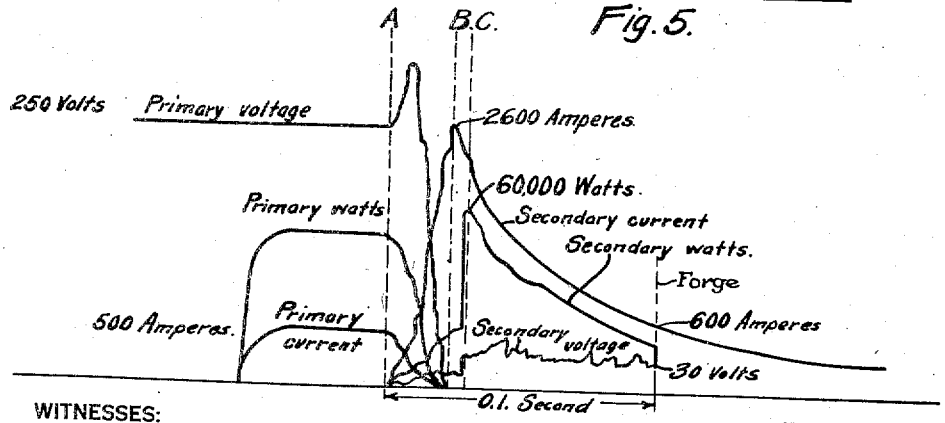

In the drawings, Figure 1 is a front elevation of a machine adapted to be employed in practicing my process for joining metal bodies; Fig. 2 is a side elevation of the machine shown in Fig. 1; Figs. 3 and 4 are detail views of the chuck members and adjacent parts employed in securing metal bodies in position to be welded together; Fig. 5 is a diagrammatic view of electrical apparatus, circuits and connections which may be employed in practicing my process, and Fig. 6 is a reproduction of a typical oscillogram which illustrates the electrical conditions which obtain when a plurality of metal bodies are percussively welded together.

In practising my invention, I may join a plurality of metal bodies, such as metal studs to plates, or metal conductors or wires to each other, by securing the wires in a suitable machine, the chuck members of which are connected to a secondary winding of a transformer or to a reactance device. The wires are maintained in engagement and the primary winding of the transformer or the reactance device is connected to a source of direct current to establish a magnetic field which links with the secondary winding. The primary circuit may then be opened, which causes the magnetic field to collapse and induce a current in the secondary circuit which includes the wires to be joined. During the discharge of energy, caused by the collapse of the magnetic field, the wires are separated, causing an arc to be drawn therebetween, and percussive engagement is then effected between the wires. Although all of the steps of the process are extremely rapid, there is a certain distinct sequence of events. For example, a discharge of electrical energy is effected through the wires which are maintained in engagement. The wires are then separated to establish an arc and wet the surface to be joined and, finally, a percussive engagement is effected between the surfaces to be joined.

In the process of percussively joining metal bodies disclosed in the patent above mentioned, a condenser is discharged through the metal bodies and the discharge is effected by providing the wires with chiseled ends, which, upon engagement, close the circuit containing the condenser, thereby producing its discharge at the instant the wires are percussively engaged. No previous preparation of the wires is necessary in my present process because the ends may either be substantially flat or have roughened surfaces. This is a distinct advantage when it is desired to join surfaces of from 3/8 to 1/2 inch in diameter. By maintaining the wires in engagement until the discharge is started, an arc may be readily drawn between the ends of the wires, which causes their surfaces to be melted to a slight depth and facilitates the joining of them when they are percussively engaged. The necessary apparatus for practising my process may be relatively compact because a sufficient amount of electrical energy may be obtained from a transformer, or reactance device of ordinary capacity to join wires of relatively large diameters.

In Figs. 1 and 2 is shown a machine, which is constructed in accordance with my invention, comprising a supporting base 1 having a substantially flat table member 2 upon which a plurality of guide rods 3 may be mounted and from which they may be insulated. The rods 3 extend through openings in the member 2 and are firmly secured in place by nuts 4 which are insulated, by suitable washers, from the member 2. The free ends of the rods 3 are maintained in proper spaced relation by a spacing member 5 which is adjustably mounted thereon. An impact member 6 has plates 7 and 8 on its upper and lower ends, respectively, which are provided with alined openings through which the rods 3 extend to maintain the member 6 in a central position between the rods. The member 6 is provided, at its lower end, with a reduced portion 9 to receive a chuck member 10 in which a wire or metal body 11 may be secured. The plate 8 is provided also with threaded openings in which set screws 12 may be positioned to rest upon, and be supported by, plates 13, which are, in turn, supported by springs 14 that surround the guide rods 3. The plates 13 are maintained in position by screws 15, which are loosely disposed in suitable openings therein and are secured to, and insulated from, the member 2.

It will be appreciated from the foregoing description that the member 6 is resiliently supported by the springs 14 in a position between the guide rods 3 directly above the plate 2. The screws 12 are employed to adjust the position of the member 6 with respect to another chuck member 16, the base of which is rigidly mounted upon the plate 2. The lower chuck member, however, is composed of relatively movable parts, the upper portion of which is secured to a forked rod 17 which functions as the armature of an electromagnet 18 supported upon an extension 19 of the plate 2. The rod 17 is pivotally mounted, as indicated at 20, so that another wire or metal body 21 may be secured in the chuck member 16 and be raised, by means of the rod 17, to engage the wire 11. It will be apparent that, when the electromagnet 18 is energized, the rod 17 will be actuated against the action of a spring 22, secured between the rod and the extension 19, to maintain the wires in engagement when the member 6 is adjusted to a proper distance above the lower chuck member 16.

Another impact member 23 may also be employed, and be maintained in alinement with the lower member 6 by a guide plate 24 that is provided with openings through which the rods 3 may be extended. The member 23 is secured to a rod 25 in any suitable manner, as by drilling a threaded opening into the member and screwing the end of the threaded rod 25 into such opening, where it is maintained in position by means of a nut 26. The rod 25 is extended through an opening in the plate 5 and is provided with an eye bolt 27 at its free end, by means of which the member may be raised to an operating position. The distance the member is raised may be accurately adjusted by the adjusting device 28, which is secured to the rod 25 by suitable set screws. The member 23 may be raised by means of the rod 25 and it may be maintained in its raised position by a latching lever 29 which is pivotally mounted upon a supporting member 30 secured to the plate 5. The lever 29 also functions as the armature of an electromagnet 31, which is also carried by the supporting member 30.

When the member 23 is raised, the lever 29 may be set to engage the adjusting device 28 and then may be maintained in such engagement by energizing the electromagnet 31. A switch 32 is mounted upon one of the guide rods 3 and is adapted to be opened, when the member 23 is dropped, by a projecting strap 33 secured to the member. A switch is utilized to open an electric circuit which causes the primary circuit of the transformer to be opened, as will be more fully described hereinafter. The coupling members 34, which are substantially of U-shape, are shown as connecting the plate 7 and the plate 24 of the respective impact members and are only utilized to afford a ready means for raising the lower member 6 when the metal bodies have been joined and it is desired to remove them from the machine.

In Figs. 3 and 4, the chuck members 10 and 16 are shown on a larger scale in order to make clear their construction. As shown in Fig. 3, conductors or cables 35 are secured to the lower chuck member 16 which carries the body 21. It will be noticed that the body 21 rests upon the upper portion of the support or base 1 of the machine and is, therefore, very firmly supported. The body 11 is secured within the chuck member 10 by a suitable set screw 36. It is necessary to insure a substantial support for the lower body against the action of the combined members 6 and 23 which are employed to effect percussive engagement of the surfaces to be joined. The cables 35 comprise one side of the secondary circuit, and the other side thereof may be secured to the upper chuck member 10 by means of a screw 37 fastened thereto. As shown in the drawing, the forked end of the rod 17 is firmly secured to a portion 38 of the chuck member 16 which fits loosely within the base of the chuck member and may be raised to effect an engagement of the bodies 11 and 21.

In Fig. 4 is shown a slight modification in which a flat plate or disk 39 may be supported in the lower chuck member 16 by employing a rod 40 having an end 41 formed with an annular chamber for receiving the disk 39. This illustration is made to indicate that various metal bodies other than rods or wires may be joined by slightly modifying the construction of the chuck members. In this instance, for example, the disk 39 may be the head of a valve to which a stem is to be welded or joined.

In order to facilitate an understanding of my process, a simplified diagram of the apparatus, circuits and connections is presented in Fig. 5. As here shown, a source of direct current, such as a generator 42, has a series field winding 43 and a shunt field winding 44, the latter being connected in series with a variable resistor 45. The generator 42 is connected, through a relay switch 46 and a manually operable switch 46ª, to a primary winding 47 of a transformer, the secondary winding 48 of which is connected to the bodies 11 and 21, that are to be joined. The relay switch 46 is adapted to be actuated by a coil 51, which is connected to terminals of the generator 42 and has the switch 32 connected in series therewith.

The switch 46 is adapted to engage and actuate a switch 52 that is connected in series with the winding of the electromagnet 18 that is connected to the terminals of the generator 42. Positive action is insured by springs 53 and 54 which are connected to the switches 46 and 52, respectively. As above described, the member 23 is maintained in a raised position by the lever 29 that is actuated by the electromagnet 31, the winding of which is connected, through a manually operable switch 55, to the generator 42.

In practicing my invention, the bodies 11 and 21 that are to be joined, are secured in the chuck members 10 and 16 of the machine and the member 6 is so adjusted that, when the bodies 11 and 21 are separated, an arc of suitable length may be drawn therebetween. The member 23 is raised to an operative position where it is maintained by adjusting the lever 29 and by energizing the electromagnet 31, which may be done by closing the switch 55. The switch 32 is, of course, in closed position and the switch 46 has its coil 51 energized, and the primary circuit is closed through the switch 46ª. When the switch 46 is energized, it is in closed position which permits the spring 54 to close the switch 52, thereby energizing the electromagnet 18 which attracts the rod or armature 17 and maintains the bodies or wires in engagement.

The system is now in readiness to perform a welding operation which is the condition illustrated in the diagram. The operation may be accomplished by opening the switch 55, which opens the energizing circuit for the electromagnet 31 and releases the lever 29, thereby permitting the member 23 to drop. The member 23 opens the switch 32 in passing by engagement of the strap 33 with the handle of the switch, thereby de-energizing the coil 51 of the switch 46. The switch 46, therefore, opens and not only opens the primary circuit but engages the switch 52 and causes it to open the energizing circuit of the magnet 18. Two operations are thus accomplished by the falling member opening the switch 32, namely, the primary circuit of the transformer is opened, and, immediately thereafter, the electromagnet 18 that maintains the bodies 11 and 21 in engagement is de-energized, which permits the body 21 to drop and cause an arc to be drawn between the ends of the bodies.

It will, of course, be apparent that, when the primary circuit is opened, a current is induced in the secondary winding 48, which traverses the bodies 11 and 21 and, when they are separated, an arc is, therefore, drawn between them. Shortly after the establishment of an arc between the bodies, the member 23 hits the member 6 and causes percussive engagement between the ends of the bodies. The complete operation, after the machine has been properly set, requires only a fraction of a second to be completed but, nevertheless, there is a distinct sequence of events. First, the primary circuit is opened, then the bodies are separted to draw an arc between them and finally, percussive engagement of the bodies is effected. The forging or joining of the bodies takes place while the induced current in the secondary circuit is of sufficient value to cause an application of intense heat at the surfaces to be joined. Furthermore, the percussive engagement so supplements the action of the electrical energy as to insure a perfect joint between the bodies whether they be of like or of unlike metals.

Although I have shown a direct-current generator as a source of energy to supply the primary winding of the transformer, or reactance device, any suitable source of direct current may be employed. My invention is not restricted to any particular electrical apparatus or to specific connections thereof but comprehends the employment of any electrical system which may be utilized to produce the proper sequence of events. Furthermore, although I have shown the lower chuck member as composed of relatively movable parts, it will be appreciated that the chuck member secured to the member 6 may be so constructed as to afford the movement between the surfaces to be joined, in order to establish an arc therebetween at the critical instant.

In Fig. 6, the copy of the oscillograms, here shown, gives a clear understanding of the electrical conditions that exist during the process of joining a plurality of metal bodies in accordance with my invention. The various curves have been tabulated in order to clearly illustrate their meaning. The broken line A indicates the point at which the switch 46 is opened, and the broken line B indicates the complete opening of the primary circuit. An appreciable lapse of time, of course, occurs between the point of starting to open the primary circuit and the point at which it is completely opened. The broken line C indicates the point at which the secondary circuit is opened by the separation of the bodies, which is caused by de-energizing the electromagnet 18. The broken line which is marked "Forge" indicates the point at which the falling member 23 causes percussive engagement of the ends of the bodies. The various points of interest on the curves have been marked to indicate the value of voltage, current and power in the secondary circuit.

As indicated in Fig. 6, the total lapse of time between the start of opening the primary circuit to the time of "Forge" is only one-tenth of a second and it will be appreciated, therefore, that the total operation is exceedingly rapid. However, the above process has proved to be exceptionally efficient in joining wires of relatively large diameter and I have found that wires so joined are so intimately united that, when, for example, copper is joined to steel and the wires are separated at substantially the point of union, a portion of the copper is found to be inseparably connected to the steel.

Although I have shown and described an electrical system and apparatus embodied therein which is suitable for practising the process of joining metal bodies, it will be obvious that my invention is not restricted to any particular apparatus or electrical system and comprehends any such process for joining metal bodies that falls within the scope of the appended claims.

The term "electromagnetic discharge", employed in the claims, is intended to mean a discharge of electrical energy from a magnetic field where the energy has been stored. This is to distinguish from an electrostatic discharge. The "electromagnetic discharge" may, of course, be obtained by means of other electrical apparatus than a transformer or a transformer of the particular type illustrated.

I claim as my invention:

1. A method of welding metallic objects that comprises storing electrical energy in a magnetic field, initiating an electrical discharge from said magnetically stored energy through the objects and immediately thereafter effecting percussive engagement of the surfaces to be welded.

2. A method of welding metallic objects that comprises maintaining the surfaces of the objects to be welded in engagement, effecting a discharge of electrical energy through the objects to be welded, separating their engaging surfaces and causing percussive engagement of the surfaces.

3. A method of welding metallic objects that comprises maintaining the surfaces of the objects to be welded in engagement, storing electrical energy in a magnetic field, discharging the stored energy through the objects to be welded and effecting a separation and percussive engagement of the surfaces to be welded during the discharge of the electrical energy through the objects.

4. A method of welding metallic objects that comprises maintaining the surfaces of the objects to be welded in engagement, storing electrical energy in a magnetic field, discharging the stored energy through the objects to be welded, drawing an arc between the objects and effecting percussive engagement of the surfaces to be welded.

5. A method of welding metallic objects that comprises effecting an electrical discharge of energy through the objects and causing an arc to be drawn and percussive engagement between the surfaces thereof during the period of energy discharge.

6. A method of welding metallic objects that comprises connecting one of a plurality of inductively related windings to a plurality of objects to be welded, establishing a magnetic field which links with the turns of the winding connected to the objects, effecting the collapse of the magnetic field to induce a current in the winding connected to the objects, separating the surfaces to be welded and effecting percussive engagement of the surfaces.

7. A method of welding metallic objects that comprises connecting a secondary winding of a transformer to a plurality of objects to be welded, maintaining the objects in engagement, causing a direct current to traverse a primary winding of the transformer, opening the primary circuit, separating the objects and effecting percussive engagement of the surfaces to be welded.

8. An electric welding apparatus comprising means for effecting percussive engagement of the surfaces to be welded and a plurality of inductively related windings, a source of direct-current electrical energy, means for electrically connecting one of said windings to said direct-current source so as to be charged with magnetically stored energy, and means for electrically connecting the other of said windings to the parts to be welded.

9. An electric welding apparatus comprising means for effecting percussive engagement of the surfaces to be welded, said means including a plurality of impact members mounted to move together to produce an impact one of which carries one of the parts to be welded and a plurality of inductively related windings, one of which has terminals by which it is adapted to be electrically energized, and the other of which is electrically connected to the parts to be welded.

10. An electric welding apparatus comprising a plurality of impact members, means for supporting a plurality of bodies to be welded, means for effecting a discharge of electrical energy through the bodies and means for producing a coaction of the impact members to effect percussive engagement of the surfaces to be welded.

11. An electric welding apparatus comprising a base member, resilient means for supporting an impact member upon the base member, means for supporting a plurality of bodies to be welded, a second impact member, means for supporting the second impact member in an aligned position above the first and means for effecting an electrical discharge of energy through the bodies to be welded.

12. An electric welding apparatus comprising a base member, resilient means for supporting an impact member upon the base member, means for supporting a plurality of bodies to be welded, a second impact member which is of less weight than the first impact member, means for supporting the second impact member in an aligned position above the first and means for effecting an electrical discharge of energy through the bodies to be welded.

13. An electric welding apparatus comprising a base member, resilient means for supporting an impact member upon the base member, means for supporting a plurality of bodies to be welded, a second impact member, electrically controlled means for supporting the second impact member in an aligned position above the first and means for effecting an electrical discharge of energy through the bodies to be welded.

14. An electric welding apparatus comprising a base member, resilient means for supporting an impact member upon the base member, means for supporting a plurality of bodies to be welded, electrically controlled means for maintaining the bodies in engagement, a second impact member which is of less weight than the first, electrically controlled means for supporting the second impact member in an aligned position above the first and means for effecting an electrical discharge of energy through the bodies to be welded.

15. The combination with a pair of clamping terminals for parts to be welded and means for effecting a percussive engagement of said parts, of a source of direct-current electrical energy and a plurality of inductively related windings, one of which is connected to the source of energy and the other of which is connected to the parts to be welded.

16. The combination with a pair of clamping terminals for parts to be welded and means for effecting a percussive engagement of said parts, of a source of direct-current electrical energy and a transformer having its primary winding connected to the source of electrical energy and its secondary winding connected to the parts to be welded.

17. The combination with a pair of clamping terminals for metal bodies to be welded and means for effecting a percussive engagement of the surfaces of said parts, of a transformer having its secondary winding connected to said clamping terminals and means for building up a unidirectional magnetic field in the transformer.

18. The combination with a pair of clamping terminals for metal bodies to be welded, electrically controlled means for maintaining the bodies in engagement and means for effecting percussive engagement of the surfaces to be welded, of means for effecting a discharge of electrical energy between the surfaces to be welded.

19. The combination with a pair of clamping terminals for metal bodies to be welded, electrically controlled means for maintaining the bodies in engagement and means for effecting percussive engagement of the surfaces to be welded, of means for effecting a discharge of electrical energy between the surfaces to be welded, said means including a plurality of inductively related windings.

20. The combination with a source of electrical energy and a plurality of inductively related windings, one of which is connected to said source, of a machine having a pair of clamping terminals connected to the other winding, one of said terminals being movable and the other having relatively movable parts, electrically controlled means for actuating the movable parts of the clamping terminal and means for rapidly moving the movable terminal to effect percussive engagement of bodies secured in said terminals.

21. The combination with a machine for welding metal bodies having a plurality of clamping terminals for holding said bodies in alinement, of electrically controlled means for maintaining the surface to be welded in engagement, means for effecting an electrical discharge of energy through said bodies, means for causing the separation of the surfaces to be welded and means for causing the percussive engagement of the surfaces to be welded.

22. An electric welding apparatus comprising means for holding said parts in contact, means for obtaining a circuit through the parts to be welded, means inherently operable immediately thereafter for separating the same and thus initiating an arc therebetween and means inherently operable immediately after the initiation of said arc to bring the parts together with a percussive impact.

23. An electric welding apparatus comprising means for obtaining a circuit through the parts to be welded, electro-magnetic means for holding said parts in contact, means for separating the same and thus initiating an arc therebetween and means inherently operable immediately after the initiation of said arc to bring the parts together with a percussive impact.

24. An electric welding apparatus comprising means for obtaining a circuit through the parts to be welded, electromagnetic means for holding said parts in contact, a spring opposing the action of said electromagnetic means, means for releasing said electromagnetic holding means and thus initiating an arc between said parts and means inherently operable immediately after the initiation of said arc to bring the parts together with a percussive impact.

25. An electric welding apparatus comprising an actuating member, means for obtaining a circuit through the parts to be welded, means for starting said actuating member, means actuated by said actuating member for initiating an arc between the parts to be welded and means operative immediately thereafter for bringing the parts together with a percussive impact.

26. An electric welding apparatus comprising an actuating member, a locking device therefor, means for releasing the locking device, means for obtaining a circuit through the parts to be welded, means actuated by said actuating member for initiating an arc between the parts to be welded and means operative immediately thereafter for bringing the parts together with a percussive impact.

27. An electric welding apparatus comprising an actuating member, a locking device therefor, electromagnetic means for releasing the same, means for obtaining a circuit through the parts to be welded, means actuated by said actuating member for initiating an arc between the parts to be welded and means operative immediately thereafter for bringing the parts together with a percussive impact.

28. Apparatus for electrically welding a metallic piece to a metallic body comprising means for mounting the metallic piece for movement in a predetermined path, means for moving one of said metallic members away from the other in the line of said path to cause an electric arc to be formed therebetween, means for subsequently causing said metallic piece to be moved into contact with said metallic body through the path of said arc, and means for causing said arc to be maintained automatically for a determined period.

29. Apparatus for electrically welding a metallic piece to a metallic body comprising means for mounting the metallic piece for movement in a predetermined path, means for moving one of said metallic members away from the other in the line of said path to cause an electric arc to be formed therebetween, means for subsequently causing said metallic piece to be moved into contact with said metallic body through the path of said arc into contact with said metallic body so as to effect welding of the metallic piece thereto, and means operating automatically under electrical control for causing said arc to be maintained automatically for a determined period.

30. Apparatus for electrically welding one metallic member to another metallic member comprising means for causing the establishment of an electric circuit through said members to obtain a welding current, means for effecting a physical bodily separation of said members to strike an electric arc therebetween, electrically controlled means for maintaining the arc and welding current for a suitable time interval, electrically controlled means operating subsequently to the striking of the arc but before the termination of the aforesaid time interval for moving one of said members through the path of the arc into contact with the other of said members so as to effect the welding of said members to each other.

In testimony whereof, I have hereunto subscribed my name this 5th day of July, 1922.

LEWIS WARRINGTON CHUBB.